(12) United States Patent
Liu et al.

(10) Patent No.: US 11,528,662 B2
(45) Date of Patent: Dec. 13, 2022

(54) SLEEP HANDLING FOR USER EQUIPMENT

(71) Applicant: Telefonaktiebolaget LM Ericsson (publ), Stockholm (SE)

(72) Inventors: Yusheng Liu, Lund (SE); Oskar Drugge, Hjärup (SE); David Sugirtharaj, Lund (SE); Emma Wittenmark, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 16/605,012

(22) PCT Filed: Mar. 23, 2018

(86) PCT No.: PCT/EP2018/057492
§ 371 (c)(1),
(2) Date: Oct. 13, 2019

(87) PCT Pub. No.: WO2018/188933
PCT Pub. Date: Oct. 18, 2018

(65) Prior Publication Data
US 2021/0127328 A1    Apr. 29, 2021

Related U.S. Application Data

(60) Provisional application No. 62/484,942, filed on Apr. 13, 2017.

(51) Int. Cl.
*H04W 52/02* (2009.01)
*H04L 41/0803* (2022.01)
(Continued)

(52) U.S. Cl.
CPC ..... *H04W 52/0212* (2013.01); *H04L 41/0803* (2013.01); *H04W 52/0261* (2013.01); *H04W 74/006* (2013.01); *H04W 74/0808* (2013.01)

(58) Field of Classification Search
CPC ........... H04W 52/0212; H04W 74/006; H04W 52/0261; H04W 74/0808; H04L 41/0803
See application file for complete search history.

(56) References Cited

U.S. PATENT DOCUMENTS

| 2014/0269397 A1* | 9/2014 | Pelletier ................ H04W 24/00 370/252 |
| 2015/0003311 A1* | 1/2015 | Feuersaenger ...... H04W 72/042 370/311 |

(Continued)

FOREIGN PATENT DOCUMENTS

| KR | 20130009459 | * | 1/2013 |
| WO | 2016148629 A1 | | 9/2016 |
| WO | 2016148634 A2 | | 9/2016 |
| WO | 2016186002 A1 | | 11/2016 |
| WO | 2017077388 A1 | | 5/2017 |

OTHER PUBLICATIONS

"On DRS and initial signal in LAA", 3GPP TSG RAN WG1 Meeting #81, R1-153015, Fukuoka, Japan, May 25-29, 2015, pp. 1-5 (Year: 2015).*

(Continued)

*Primary Examiner* — Chae S Lee
(74) *Attorney, Agent, or Firm* — Murphy, Bilak & Homiller, PLLC

(57) ABSTRACT

An eNB and a method for use in a base station (eNB) for configuring a UE to be awake for a longer duration in order to detect eNB transmission after the end of initial Signalling.

17 Claims, 5 Drawing Sheets

(51) Int. Cl.
*H04W 74/00* (2009.01)
*H04W 74/08* (2009.01)

(56) References Cited

U.S. PATENT DOCUMENTS

| | | | |
|---|---|---|---|
| 2015/0092645 A1* | 4/2015 | Tabet | H04L 1/1671 |
| | | | 370/311 |
| 2016/0095114 A1 | 3/2016 | Kim et al. | |
| 2016/0150474 A1* | 5/2016 | Ang | H04W 52/0293 |
| | | | 370/311 |
| 2016/0286603 A1* | 9/2016 | Vajapeyam | H04W 72/0453 |
| 2017/0339641 A1* | 11/2017 | Nigam | H04L 5/0096 |
| 2018/0069653 A1* | 3/2018 | Fujishiro | H04L 1/0003 |
| 2018/0115983 A1* | 4/2018 | Harada | H04J 11/00 |
| 2018/0249509 A1* | 8/2018 | Yi | H04W 48/16 |
| 2019/0029051 A1* | 1/2019 | Lu | H04W 74/0866 |
| 2019/0132103 A1* | 5/2019 | Yang | H04L 5/0037 |

OTHER PUBLICATIONS

Unknown, Author, "eMTC-U Battery life analysis", MFA—TSG Telco Meeting #10; Group: TSG Radio Group; Huawei Technologies Co., Ltd., Apr. 24, 2017, pp. 1-8.

Unknown, Author, "On DRS and initial signal in LAA", 3GPP TSG RAN WG1 Meeting #81, R1-153015, Fukuoka, Japan, May 25-29, 2015, pp. 1-5.

Unknown, Author, "Wideband transmission systems; Data transmission equipment operating in the 2,4 GHz ISM band and using wide band modulation techniques; Harmonised Standard covering the essential requirements of article 3.2 of Directive 2014/53/EU", ETSI EN 300 328 V2.1.0, Sep. 2016, pp. 1-101.

Unknown, Author , "LAA initial signal design", 3GPP TSG RAN WG1 Meeting #83, R1-157171, Anaheim, California, USA, 15th-22nd 2015, 1-4.

* cited by examiner

SLEEP HANDLING FOR USER EQUIPMENT

TECHNICAL FIELD

Method and base station for reconfiguring a UE for staying awake for longer duration.

BACKGROUND

The 3GPP initiative "License Assisted Access" (LAA) intends to allow LTE equipment to also operate in the unlicensed radio spectrum such as the 5 GHz band. The unlicensed spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

In addition to LAA operation, it should be possible to run LTE fully on the unlicensed band without the support from the licensed band. This is called LTE-U Stand Alone.

The 3GPP initiative "License Assisted Access" (LAA) intends to allow LTE equipment to also operate.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method should be applied. Today, the unlicensed 2.4 GHz spectrum is mainly used by equipment implementing the IEEE 802.11 Wireless Local Area Network (WLAN) standard. This standard is known under its marketing brand "Wi-Fi."

The LBT procedure leads to uncertainty at the eNB regarding whether it can transmit a DL subframe(s) or not. This leads to a corresponding uncertainty at the UE as to if it has a subframe to decode or not. An analogous uncertainty exists in the UL direction where the eNB is uncertain if the UEs scheduled on the SCell actually transmitted or not.

For eMTC technologies to use the 2.4 GHz spectrum, there are several classifications for compliance [ETSI EN 300 328]. The system may be frequency hopping or wideband transmissions. To be considered for frequency hopping, the bandwidth must be narrow enough to hop on N individual frequencies within the band, where N is at least 15. Narrow bandwidth is generally favorable for eMTC operation as it has reduced complexity and power saving for devices. A further advantage is that higher transmit power is allowed since wideband transmissions should comply with a low power spectral density (PSD). The PSD limitation is 10 dBM/1 MHz.

Within the frequency hopping classification, there is a further choice of being adaptive or non-adaptive. Being adaptive allows a longer continuous transmission (60 ms) vs a shorter on-off transmission of 30 ms in total with 5 ms on and 5 ms off burst pattern.

Non-adaptive transmissions are good for coverage enhancement since it would be deterministic and predictable and thus allow repetition at the transmitter and accumulation at the receiver to improve coverage.

Adaptive transmissions require CCA (Clear Channel Assessment) before the transmission and hence interference from other systems can delay the transmission. Instead of delaying the transmission, another alternative is to adapt a frame based transmission where if the CCA fails, the transmission burst is dropped totally and the next scheduled transmission is attempted. The occasions where such transmission occur are known the UE and so the system has deterministic behavior in that sense. If the UE does not detect the transmission, it can save power by going to sleep and waking up for the next occasion.

This invention is based on the adaptive frequency hopping solution. ETSI 300 328 specification has the following rules regarding LBT based FHSS (Frequency Hopping Spread Spectrum) systems operating in the 2.4 GHz band.

1. The CCA check using energy detection shall not be less than 0,2% of the channel occupancy time, with a minimum of 18 µs.
2. If the CCA fails, it can remain on the frequency for the remainder of the dwell time while performing eCCA. The eCCA is a random duration between the CCA observation time and 5% of the MCOT (Maximum Channel Occupancy Time).
3. The MCOT for a given hopping frequency, which starts immediately after a successful CCA or eCCA shall be less than 60 ms followed by an Idle Period (IP) of minimum 5% of the MCOT with a minimum of 100 µs.

An example using the maximum value of MCOT: An equipment with a dwell time of 400 ms can have 6 transmission sequences of 60 ms each, separated with an idle period of 3 ms. Each sequence was preceded with a successful CCA check of 120 µs. Note that the MCOT of 60 ms applies to one transmitting node.

One problem with the adaptive FH (Frequency Hopping) transmission scheme is whether the UE (User Equipment) can detect eNB transmissions and hence make decision to stay receiving the rest of the transmission or to go to sleep and wait for the next transmission occurrence. In the cell, there will be UEs with good coverage and others at the cell edge with less than ideal coverage. One solution already suggested for this problem is to transmit an initial signal which is robust and the UE can detect with high probability. Such an initial signal is considered overhead and is not good for co-existence so trying to minimize the length while maintaining coverage is required. Typically, in a system transmitting user data with length of 1 ms (1 TTI (Transmission Time Interval)) then the IS (Initial signalling) signal could be around 2 ms or greater. From the eNB (Evolved NodeB or base station) perspective, the transmission burst is scheduled with the DL/UL (Downlink/Uplink) for the UEs in the cell. The eNB performs LBT and when successful starts the initial signal. While the starting position of the initial signal may vary, the ending is fixed so the UE can know deterministically when the DL/UL transmission are. If the initial signal (IS) is successful, the eNB continues with the scheduled DL (Downlink) and UL (Uplink) transmissions. If the IS signal fails to be transmitted, the rest of the transmission on the current frequency is abandoned. The eNB waits till the end of the dwell and hops to the next frequency. UEs behavior is that if the IS signal is not detected, it goes to sleep until the end of the dwell and then hops to the next frequency. See FIG. 1 showing a frame structure for such adaptive frequency hopping (MCOT).

One point is that in LTE based systems the scheduling of DL transmissions is done several subframes in advance due to the processing delay for encoding and preparing a TTI. In particular there is also a processing delay between the BB processing unit and the radio head, which in some configurations can be remotely located. In one embodiment the BB processing is performed by the processor or CPU as being part of the general controller, and the RF processing is performed by the RF interface, a processor of the RF interface then also being a part of the general controller, but in this embodiment the general processor is thus comprised of at least two processors, This means that when the LBT succeeds just at or close to the end of the IS transmission, the first few subframes have been processed in the baseband unit and is waiting for transmission at the radio head.

Another point is that it is pessimistic to think that just because the IS transmission has failed, there are not some UEs with very good coverage that could receive the downlink subframes.

So in the cases when the LBT succeeds very near the end of the IS transmission (the IS length is so small that in principle it does not count as being transmitted, potential UE transmissions are lost. In a more generalized sense, some UEs are in such good coverage that they can be reliably scheduled.

Yet another point is that while battery consumption is important in eMTC (enhanced Machine Type Communication) and eMTC in unlicensed bands, there could be a class of UEs that can tolerate higher battery consumption (e.g. connected to power supply or have lower battery life requirements) and can sacrifice battery life for more coverage. These UEs can remain awake attempting to decode DL subframes.

SUMMARY

The inventors have realised after inventive thinking and reasoning that instead of abandoning the transmission on the dwell frequency when the IS fails, UEs that are in very good coverage areas could be signalled to remain awake for the first several DL subframes to listen for DL data transmissions.

In eMTC low mobility is typical, so signalling via higher layers (RRC) would be sufficient to inform good coverage UEs. These UEs would continue to monitor the downlink control information (DCI) from the eNB to see if there are any transmission for the UE. If the DCI (Downlink Control Information) indicates that in this transmission (dwell) there are no transmission for said UE, and the UE can thus go to sleep.

In one embodiment the UE is configured to signal its battery life capability to the eNB. If there are such UEs in the cell with lower battery consumption requirements, the eNB may decide to continue to transmit DL data subframes during the dwell period. In the case where there are only UE with strict battery consumption requirements, those can be allowed to go to sleep if the IS is not transmitted in order to save power.

Another alternative solution is that the eNB can send a floating IS in addition to the fixed IS before the dwelling boundary. If fixed IS is not transmitted due to LBT failures, eNB can send a shorter version of floating IS so that good coverage UEs have increased chance to detect the eNB transmission. The time window to schedule floating IS could be based on the present UE capability— if UEs have a constant power supply and do not need to sleep (or sleep with an aggressive DRX (Discontinuous Reception) configuration), the floating IS window could be longer. But the actual MCOT occasion should never cross to the next dwell period to allow system wide transmission detection based on fixed IS timing.

The reason for not transmitting the same length of floating IS is that deep coverage battery constraint UEs should follow only the fixed IS in order to prolong their battery life. Thus there's no point to have as many IS repetition as possible as the inventors have realised.

The teachings herein bring about at least the benefits below.

Due to the scheduling latencies between the baseband and LBT results at the radio head. Some process DL subframes are already at the radio head waiting for transmission. It is wasteful to drop it immediately. It would consume more energy at the eNB to drop and reprocess and reschedule the DL subframes.

It is wasteful for UEs in good coverage that could receive DL subframes without the IS to go back to sleep without receiving any data. Waking up, tuning, receiving and going back to sleep consumes battery life without any data received.

Not all UEs have the same battery or power supply issues. By including this aspect in the UE capability, the eNB can scheduling these types of UE early in the transmission.

BRIEF DESCRIPTION OF DRAWINGS

The invention will be described in detail with reference to the attached figures, of which.

DETAILED DESCRIPTION

The invention will now be disclosed in detail through example embodiments.

Figure 1:
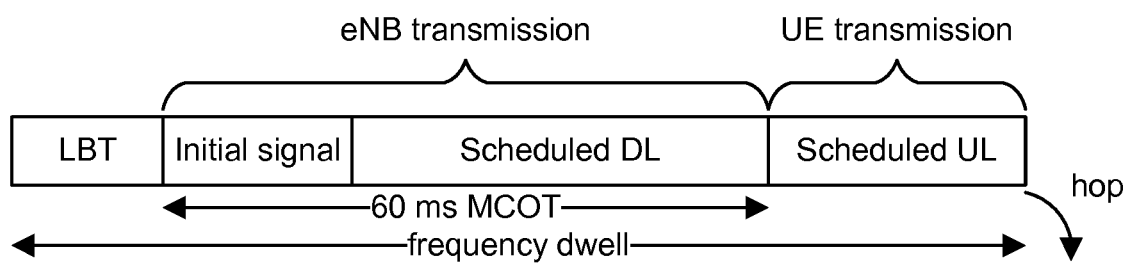
FIG. 1 shows a schematic view of a frame structure according to herein.
Figure 2:
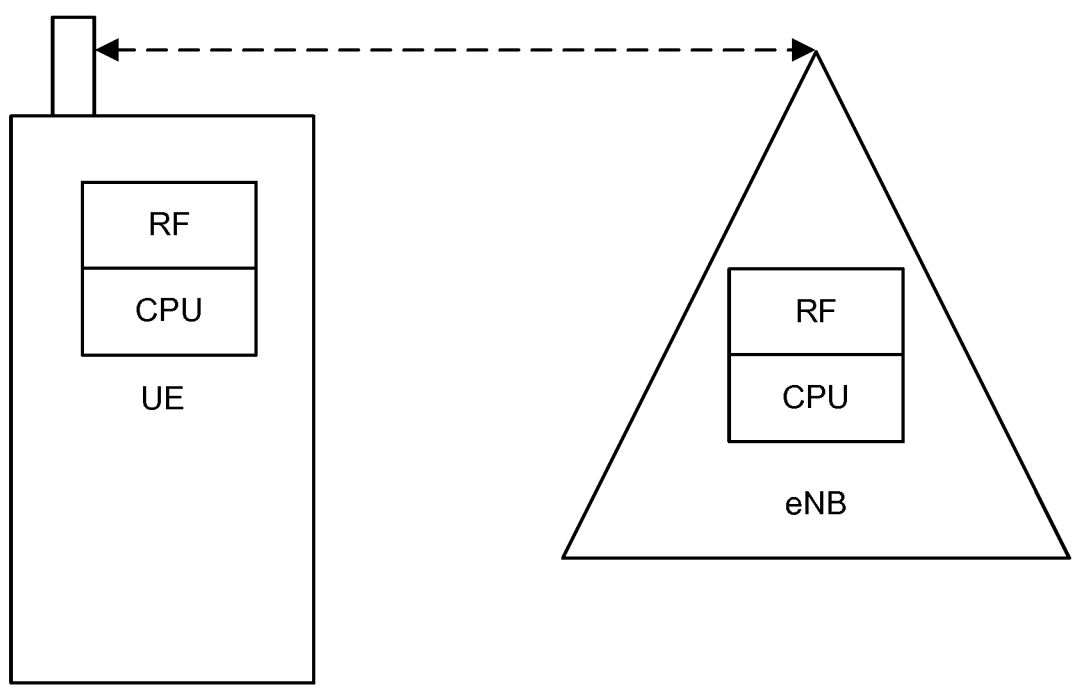
FIG. 2 shows a schematic view of a User Equipment in a telecommunications system adapted according to herein.

FIG. 2 shows a schematic view of a telecommunications system according to the teachings herein where a User Equipment (UE) comprises a controller (CPU) for controlling the overall operation of the UE. The controller may comprise of one or more processors each assigned a task or arranged to cooperate to perform a task. For the purpose of this text, the controller will be treated as one entity, but many variants exist as would be understood to a skilled person.

The UE further comprises an interface, especially a radio frequency interface (RF) for establishing communication with other UEs or a base station (eNB) such as an evolved NodeB. The base station or eNB comprises a controller (CPU) for controlling the overall operation of the eNB and an interface RF for communicating with other entities such as a telecommunications server (not shown) and the UE.

Returning to the invention, the purpose of the initial signal is to be robust for all UE in the cell to detect and establish timing to the cell and receive the DL scheduled data and transmit UL data. The robustness is primarily embodied in the fact that it is tolerant to frequency error so that the UE can perform AGC, AFC and set the fine timing prior to the DL data burst. It is assumed that the UE has coarse timing, enough to detect the IS signal and establish fine tune with the cell.

But not all UEs need the IS signal to perform AGC, AFC and set the fine timing prior to receiving the DL data subframes. eMTC is targeting low mobility scenarios where the cell timing does not drift too much so it is possible if the signal is of good quality to set the gain, frequency and timing with the actual DL data subframes. Naturally the DL data subframes also contains reference signal on which to tune. Data subframes also contain very short signal which have similar composition to the IS signal. In LTE synchronization signals, such as the Primary and Secondary Synchronization Signals (PSS/SSS) are such signals that the UE can use to tune to the cell.

So, one point is that some UEs in the cell have the potential to receive DL data subframes without the aid of the IS. The second point is that these first few subframes have already been processed and are ready for transmission on a radio head which in some configurations are remote from the baseband unit.

The invention lies in signalling certain UEs to remain awake even if the IS signal is not detected. Signalling can be done via RRC messages. If the UE moves out of the good coverage area, it can be signalled to immediately go to sleep when the IS is not detected.

In some embodiments, if the eNB clears LBT after the end of the fixed IS occasion, the eNB may still send another floating IS between LBT success and the next scheduled DL transmission which is typically at subframe boundary. If the eNB determines this time is not sufficient for UEs to detect its transmission, it may send a longer floating IS that overrides part of the scheduled DL transmissions which leads to rescheduling of the overridden DL data at a later time.

Figure 3:
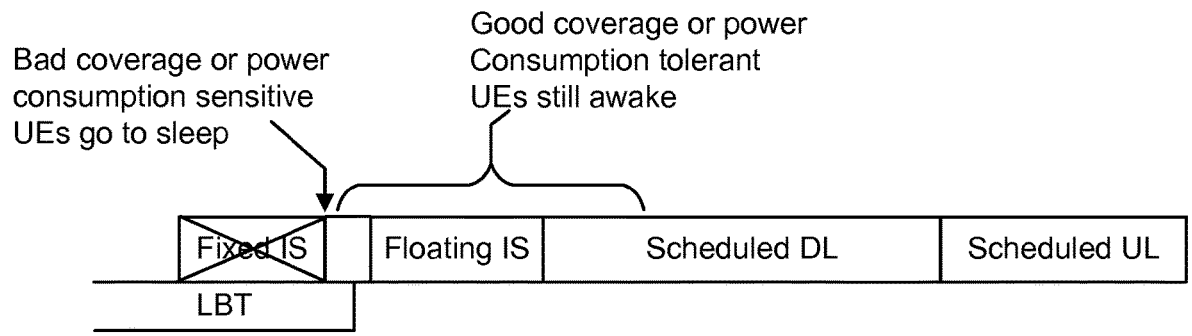
FIG. 3 shows a frame structure and how it relates to transmitting conditions according to herein.

Upon detecting the floating IS the UE can continue with processing subsequent data transmissions in the same way as detecting the fixed IS. See FIG. 3 showing a frame structure and how it relates to transmitting conditions. As can be seen, during the initial signalling, there might be a period where UEs sensitive to power consumption have entered a sleep mode or where there is bad coverage and a period where UEs that are tolerant to power consumption are still awake (i.e. not in a sleep mode) or there is good coverage. And where the UE keeps awake after the fixed IS session or period and detects eNB transmission based on floating IS.

Since UEs could go to sleep mode when not detecting the fixed IS at the end of the fixed IS occasion, the eNB may configure UEs to keep awake for a certain period even after the end of the fixed IS. This is however not good for UE's power consumption thus causing shorter battery life which is essential for some IoT UEs. The eNB may configure good coverage UEs for being awake for a short while since these UEs has higher chance to detect short floating IS and thus have less impact on power consumption.

There may be UEs that are not sensitive to power consumption, e.g. connected to power supply, and thus do not need long sleeping cycles or short wakeup time. Such UE may inform the eNB its power consumption requirement so that the eNB can configure longer wakeup time, or even without sleep configuration.

The eNB may dynamically configure the length of the floating IS in order to allow UEs above the corresponding coverage ranking to be able to detect the eNB transmission. If eNB determines that no UE is awake after the end of the fixed IS, it can skip sending the floating IS and data, until re-attempting channel access at the next fixed IS occasion.

In other embodiments, the UE may detect eNB transmission based on non-IS transmissions e.g. LTE PSS/SSS, reference signals, or PDCCH/PDSCH, if the eNB clears LBT after the end of the IS.

One embodiment is to signal the number of subframes after the IS expected position to remain awake, or via DRX configurations where the UE's sleeping cycle starts in a period after the end of IS. One embodiment is for the eNB to signal via PDCCH in the first one or more subframes how long for UEs to remain awake and receive DL data transmission.

One embodiment is to set the number of subframes to remain awake to match the eNB processing delays between LBT and baseband signal processing.

Figure 4:
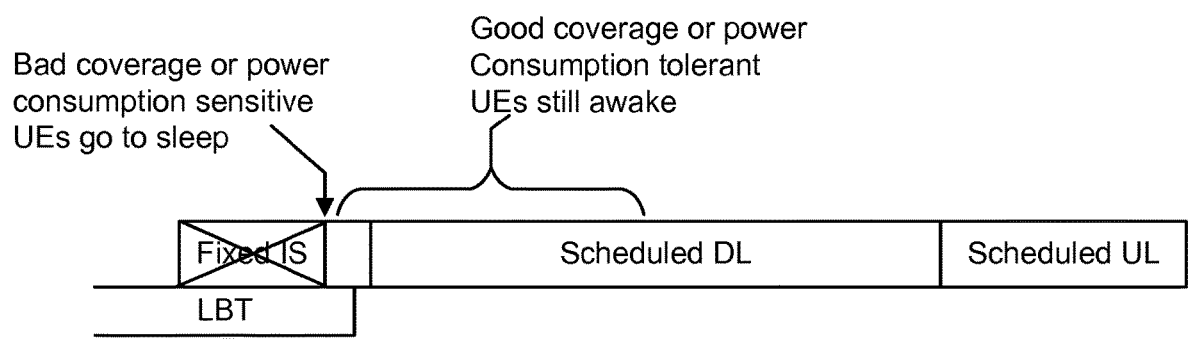
FIG. 4 shows an alternative frame structure and how it relates to transmitting conditions according to herein.
Figure 5:
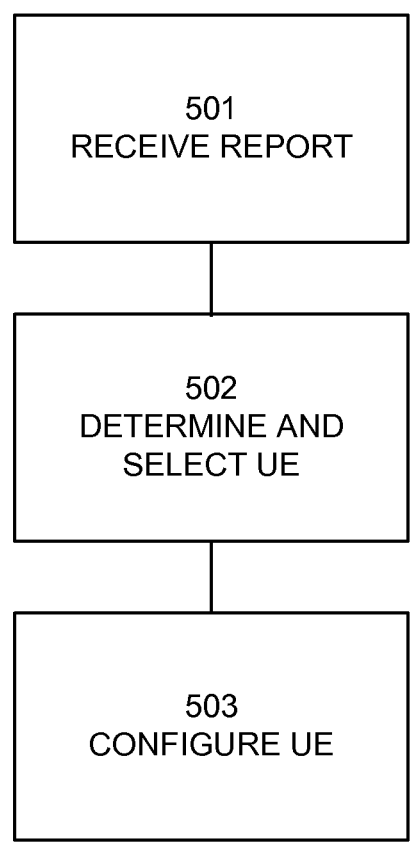
FIG. 5 shows a flowchart for a method according to herein.
Figure 6:
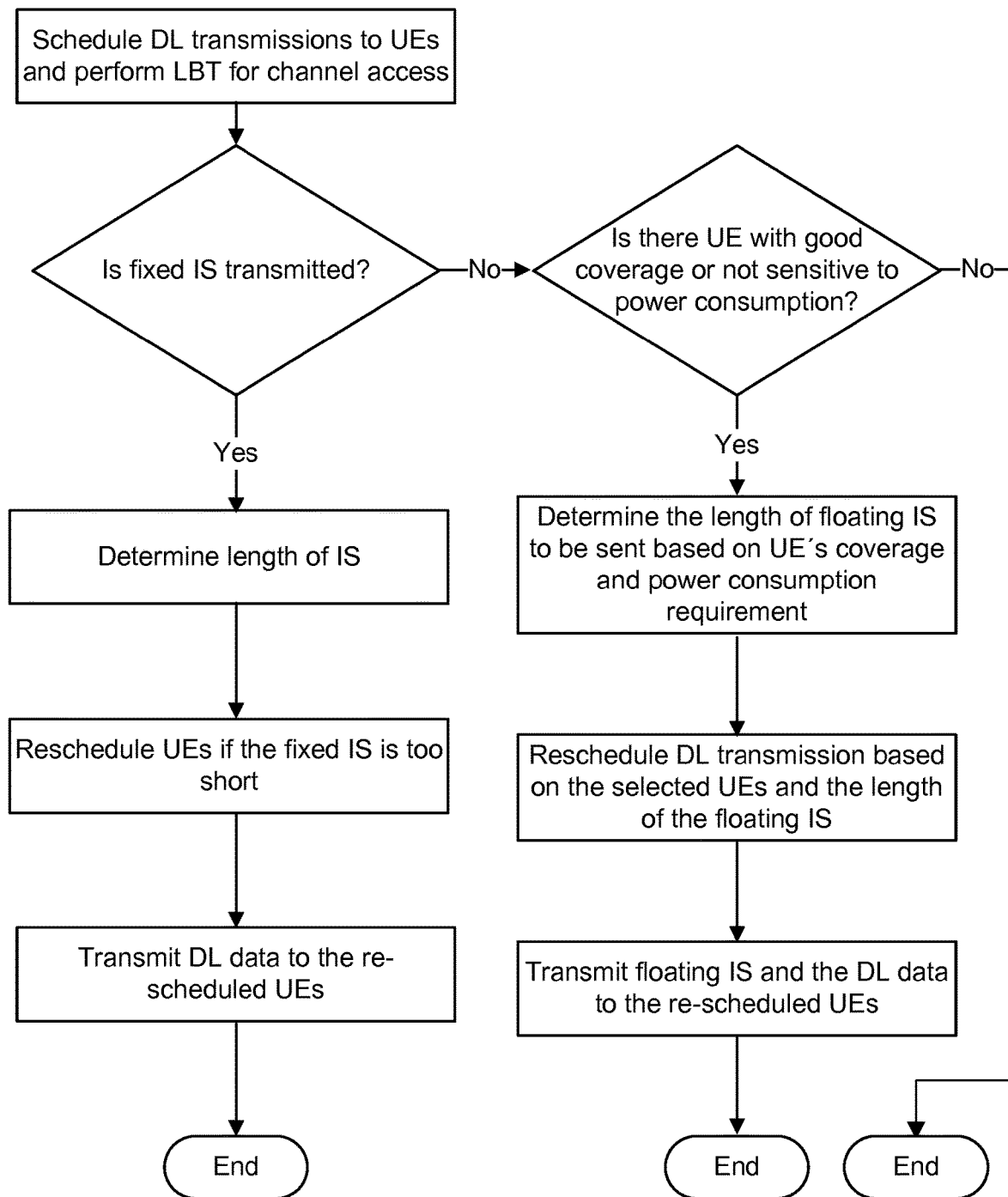
FIG. 6 shows a flowchart for a method according to herein.
Figure 7:
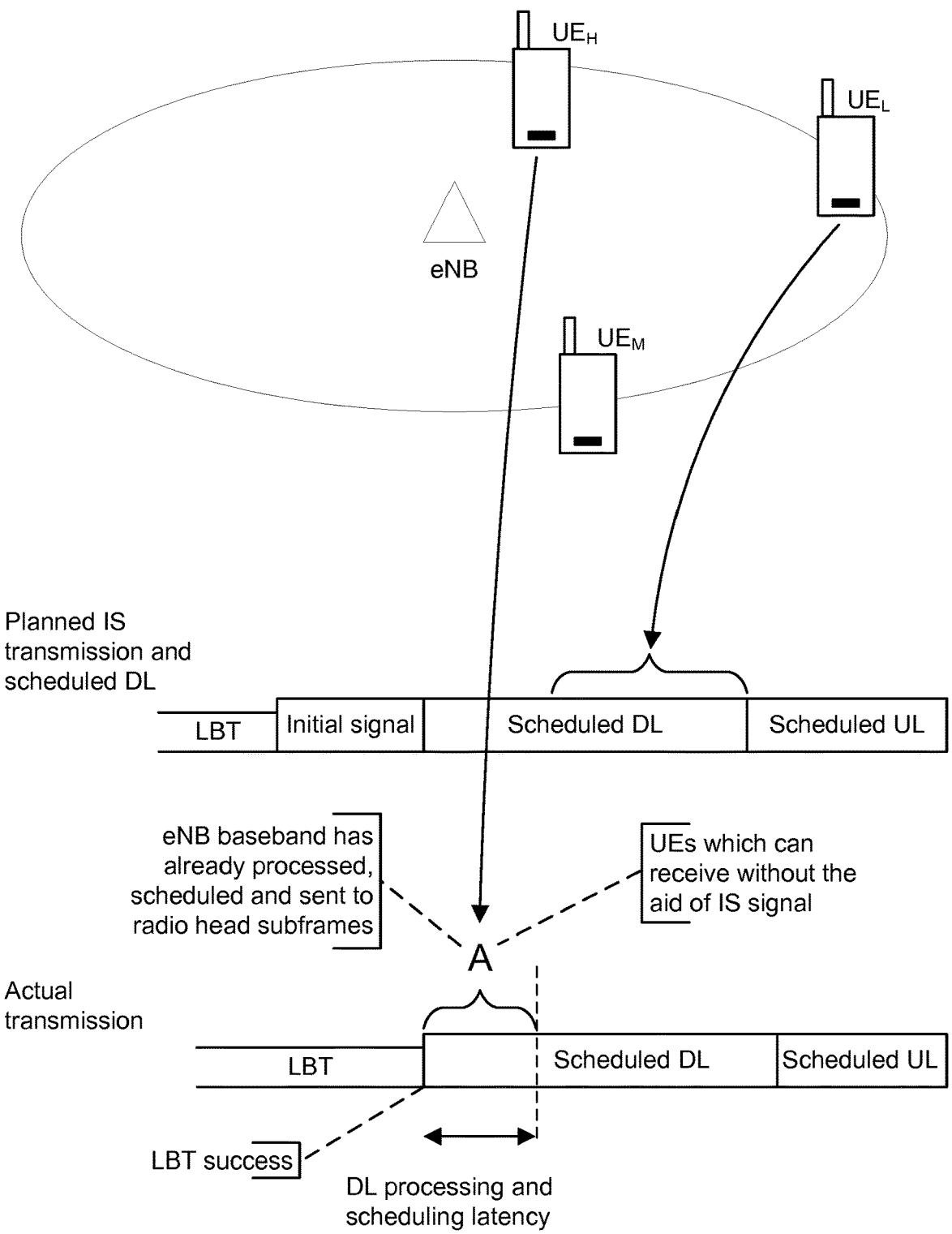
FIG. 7 shows eNB scheduling of good coverage UEs in the latency period according to herein.

One embodiment is to understand the battery life requirements of UE in the good coverage area and adjust the number of subframes they should be awake. The requirements may contain recommended sleep cycle, wake-up ratio or an indicator of the power save level (e.g. no power save if connected to power supply, or strict power save in case a IoT device that needs to operate many years with constrained battery). The UEs with strict (long life) battery consumption requirements, are scheduled first while other UEs with shorter battery life requirements are scheduled in later subframes. Given the short time frame we are addressing in the order of milliseconds it probably is not so efficient for these UE to perform a short sleep and wake up before receiving the scheduled subframe for that UE. See FIG. 4 showing a frame structure as in FIG. 3, but where the UE keeps awake after fixed IS occasion and detects eNB transmission based on sync signals or reference signals within DL data transmissions FIG. 5 illustrates how the eNB could utilize UE's power consumption requirement report after having received it through a flowchart for a method according to herein in an example system as in FIG. 7 showing eNB scheduling of good coverage UEs in the latency period. FIG. 6 also shows a flowchart for a method according to herein in an example system as in FIG. 7 showing eNB scheduling of good coverage UEs in the latency period. In the system of FIG. 6, three UEs are shown, UEH, UEL and UEM along with frame structures showing the transmissions. As can be seen the eNB baseband has already been processed, scheduled and sent to radio head subframes at point A. At this point the UEs that can receive without the aid of IS signals are receiving.

Returning to the flowchart, as it has been determined that a eNB has not been able to transmit any IS, the eNB determines to configure the UE to be awake for a longer duration in order to detect eNB transmission after the end of IS by performing the following steps. The eNB receives UE power consumption requirement(s) in a first step 501 and thereafter determines whether there is a UE with good coverage or not sensitive to power consumption. If there is such a UE, the eNB selects that UE in step 502 and configures the selected UE to be awake for a certain period after the end of the fixed IS in order to allow UE detecting any floating IS transmission(s) in step 503.

The eNB may then determine the length of the floating IS to be sent based on the UE's coverage and/or power consumption requirement and reschedules DL data if the floating IS overrides some of the scheduled DL transmissions.

FIG. 6 shows a flowchart for handling floating IS an eNB schedules DL transmission to UEs and perform LBT for channel access and then determines if fixed IS is transmitted.

If fixed IS is transmitted, the eNB determines the length of the IS, reschedules UEs if the length of the fixed IS is under a threshold value (i.e., being too short) and transmits DL data to the re-scheduled UEs.

If fixed IS is not transmitted, the eNB determines if there is a UE with good coverage or not sensitive to power consumption, and if there is the eNB determines the length of the floating IS to be sent based on the UE's coverage and/or power consumption requirement, reschedules the DL transmission based on the selected UEs and the length of the floating IS and transmits the floating IS and the DL data to the re-scheduled UEs.

The UE is thus configured to receive configurations and to adapt accordingly. The UE receives these configurations after having transmitted its battery requirements to the eNB. The UE may be configured to determine that the battery requirements have changed and in response thereto transmit updated battery requirements to the eNB. The eNB may then in turn determine a new configuration that is transmitted back to the UE.

The UE may determine that the battery requirements have changed based on that the battery level has become too low or passed under a threshold value (such as 5%, 10%, 15% of the total battery power) or that a power source has been connected to the UE.

The invention claimed is:

1. A base station comprising a controller and an interface, wherein the controller is configured to:
    determine that there is a user equipment (UE) that can receive downlink subframes reliably or that is not sensitive to power consumption, or both;
    select that UE; and
    signal the selected UE with information instruction instructing the selected UE to remain awake for a certain period after the end of an interval allocated for eNB transmission of Initial Signalling (IS) in response to success of a listen-before-talk (LBT) procedure performed by the eNB.

2. The base station of claim 1, wherein the controller is further configured to determine that a eNB has succeeded with a Listen Before Talk procedure after a particular period and is therefore not able to transmit an IS.

3. The base station of claim 1, wherein the controller is further configured to configure the UE by:
    configuring the selected UE to be awake for a certain period after the end of a fixed IS in order to allow the UE to detect a floating IS transmission.

4. The base station of claim 1, wherein the controller is further configured to determine the length of a floating IS to be sent based on at least one of the UE's coverage or power consumption requirement.

5. The base station of claim 1, wherein the controller is further configured to reschedule Downlink data if a floating initial signalling overrides one or more scheduled Downlink transmissions.

6. The base station of claim 1, wherein the controller is further configured to schedule Downlink data to only target transmission to a selected UE.

7. The base station of claim 1, wherein the controller is further configured to base the determination on a coverage ranking of the UE.

8. The base station of claim 1, wherein the controller is further configured to base the determination on the UE's power consumption requirements.

9. The base station of claim 1, wherein the controller is further configured to base the determination on additional floating IS.

10. The base station of claim 1, wherein the controller is further configured to base the determination on eNB data transmissions containing LTE sync signals or reference signals.

11. The base station of claim 1, wherein the controller is further configured to determine a length of a floating IS based on the coverage ranking of the UE that is still awake.

12. The base station of claim 8, wherein the controller is further configured to receive the power consumption requirements from the UE.

13. A method for use in a base station, the method comprising:
    determining that there is a user equipment (UE) that can receive downlink subframes reliably or that is not sensitive to power consumption, or both;
    selecting that UE; and
    signaling the selected UE with information instruction instructing the selected UE to remain awake for a certain period after the end of an interval allocated for eNB transmission of Initial Signalling (IS) in response to success of a listen-before-talk (LBT) procedure performed by the eNB.

14. A User Equipment comprising:
    radio circuitry; and
    processing circuitry operatively coupled to the radio circuitry and configured to:
    transmit battery requirements to a base station; and
    receive signalling instructing the User Equipment to be awake for a certain period after the end of an interval allocated for eNB transmission of Initial Signalling (IS) in response to success of a listen-before-talk (LBT) procedure performed by the eNB, even if IS is not detected by the UE in the allocated interval.

15. The User Equipment of claim 14, wherein the processing circuitry is further configured to determine that a battery level has passed a threshold level and in response thereto transmit updated battery requirements to the base station.

16. The User Equipment of claim 14, wherein the processing circuitry is further configured to determine that a power source has been connected to the UE and in response thereto transmit updated battery requirements to the base station.

17. A method for use in a User Equipment, the method comprising:
    transmitting battery requirements to a base station; and
    receiving signalling instructing the User Equipment to be awake for a certain period after the end of an interval allocated for eNB transmission of Initial Signalling (IS) in response to success of a listen-before-talk (LBT) procedure performed by the eNB.

* * * * *